US006967898B2

(12) United States Patent
Leaney (10) Patent No.: US 6,967,898 B2
(45) Date of Patent: Nov. 22, 2005

(54) METHOD OF PROCESSING VERTICAL SEISMIC PROFILE DATA USING EFFECTIVE VTI MODELS

(75) Inventor: Scott Leaney, Cuckfield (GB)

(73) Assignee: Schlumberger Technology Corporation, Sugar Land, TX (US)

(*) Notice: Subject to any disclaimer, the term of this patent is extended or adjusted under 35 U.S.C. 154(b) by 313 days.

(21) Appl. No.: 10/297,036

(22) PCT Filed: Jul. 9, 2001

(86) PCT No.: PCT/IB01/01224

§ 371 (c)(1),
(2), (4) Date: Nov. 27, 2002

(87) PCT Pub. No.: WO02/08792

PCT Pub. Date: Jan. 31, 2002

(65) Prior Publication Data

US 2003/0151976 A1 Aug. 14, 2003

(30) Foreign Application Priority Data

Jul. 22, 2000 (GB) .............................. 0017929

(51) Int. Cl.$^7$ ................................. G01V 1/28
(52) U.S. Cl. .................... 367/52; 367/38; 367/57; 702/14
(58) Field of Search .............. 367/38, 52, 57; 702/11

(56) References Cited

U.S. PATENT DOCUMENTS

| 4,802,146 A | | 1/1989 | Moeckel | |
|---|---|---|---|---|
| 4,894,809 A | * | 1/1990 | Moeckel | 367/57 |
| 5,570,321 A | | 10/1996 | Bernitsas | |
| 5,761,062 A | | 6/1998 | Chambers | |
| 5,982,706 A | | 11/1999 | Byun | |
| 5,995,446 A | * | 11/1999 | Meyer et al. | 367/25 |

FOREIGN PATENT DOCUMENTS

| EP | 0 206 457 | 12/1986 |
|---|---|---|
| GB | 2 332 947 | 7/1999 |

OTHER PUBLICATIONS

Kohler and Koenig. Reconstruction of reflecting structures from vertical seismic profiles with a moving source. Geophysics, Oct. 1986. pp. 1923–1938.*
Sayers, C.M. "Anisotropic velocity analysis." Geophysical Prospecting, 1995. pp. 541–568.*
Tsvankin and Thomsen. "Nonhyperbolic reflectoin moveout in anisotropic media." Geophysics, Aug. 1994.*
Ursin, Bjorn. "Offset-dependent geometrical spreading in a layered medium." Geophysics, Apr. 1990. pp. 492–496.*
Leaney, Sayers and Miller. "Analysis of Multiazimuthal VSP data for anisotropy and AVO." Geophysics, Jul.–Aug. 1999.*
Sayers, C.M., "Determination of anisotropic velocity models from walkaway VSP data acquired in the presence of dip", Geophysics, vol. 62, No. 3 (May–Jun. 1997); pp 723–729.
Tsvankin, I., Thomsen, L., "Nonhyperbolic reflection moveout in anisotropic media", Geophysics, vol. 59, No. 8 (Aug. 1994); pp. 1290–1304.

(Continued)

*Primary Examiner*—Bernarr E. Gregory
*Assistant Examiner*—Scott Hughes
(74) *Attorney, Agent, or Firm*—William L. Wang; Brigitte Echola; Dale Gaudior (57) ABSTRACT

A method of applying an effective velocity model to vertical seismic profile (VSP) seismic data comprises correcting for offset using a non-hyperbolic effective velocity model so as to take account of the earth's layering and anisotropy. One preferred non-hyperbolic model for the relationship between offset and travel time is: formula (I) where t is the travel time of seismic energy from the source to the receiver, x is the offset between the source and the receiver, and z is the depth of the receiver.

22 Claims, 8 Drawing Sheets

OTHER PUBLICATIONS

Ursin, B., "Offset–dependent geometrical spreading in a layered medium", Geophysics, vol. 55, No. 4 (Apr. 1990); pp. 492–496.

Sayers, C.M., Ebrom, D.A., "Seismic traveltime analysis for azimuthally anisotropic media: Theory and experiment", Geophysics, vol. 62, No. 5 (Sep.–Oct. 1997), pp. 1570–1582.

Leaney, W.S., "Look–ahead walkaway using effective VTI models".

L. Thornsen, "Weak elastic anisotropy", Geophysics, vol. 51 pp. 1954–1966, 1986.

B. Ursin, "Short Note Offset–dependent geometrical spreading in layered medium", Geophysics, vol. 55, pp. 492–496, 1991.

T. Alkhalitah "Velocity analysis using nonhyperbolic moveout in transversely isotropic media", Geophysics, vol. 62, pp. 1839–1854, 1997.

* cited by examiner

METHOD OF PROCESSING VERTICAL SEISMIC PROFILE DATA USING EFFECTIVE VTI MODELS

FIELD OF THE INVENTION

The present invention relates to a method of processing seismic data, in particular to the processing of seismic data acquired using a vertical seismic profile (VSP) seismic surveying method.

DESCRIPTION OF RELATED ART

Seismic data are collected using an array of seismic sources and seismic receivers. In the case of a seismic survey carried out on land, the data may be collected using, for example, explosive charges as seismic sources and geophones as seismic receivers. In particular, geophones that are able to record the amplitude of seismic energy in three independent directions are often used as seismic receivers.

Figure 1:
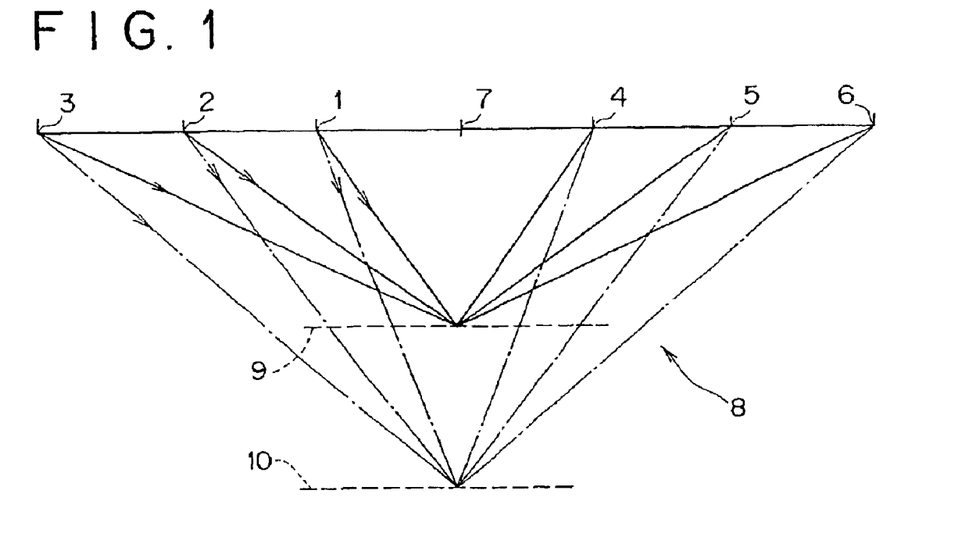
FIG. 1 is a schematic illustration of a surface mode seismic survey.

FIG. 1 schematically illustrates one source and receiver arrangement First, second and third seismic sources 1, 2 and 3 co-operate respectively with first, second, and third receivers 4, 5 and 6. The sources and receivers are arranged about a common mid point 7. For the sake of simplicity, the stratum or rock 8 beneath the sources and receivers will be assumed to be isotropic and to contain first and second horizontal partial reflectors 9 and 10. Seismic energy produced from the actuation of the first source 1 is reflected from the partial reflectors 9, 10 and received by each of the receivers 4, 5 and 6. However, for the sake of simplicity only energy reflected from beneath the common mid point 7 will be considered here. Thus, with this simplification, we consider only energy received at the first receiver 4 as a result of actuation of the first source 1, energy received at the second receiver 5 as a result of actuation of the second seismic source 2, and energy received at the third receiver 6 as a result of actuation of the third seismic source 3. The "round trip" travel time of the energy from a seismic source to its associated receiver increases with increasing horizontal distance (offset) between the source and the receiver. The round trip travel time is also a function of the depth of the reflectors 9, 10. The horizontal distance between the source and the receiver is generally known as "offset".

After the raw seismic data have been acquired, the reflected signals (known as traces) received by each of the receivers as a result of the actuation of a source of seismic energy are processed to produce a sub-surface image. The processing includes the steps of transforming (or "migrating") the signals to their actual sub-surface locations. The traces are then corrected to account for the "offset" between the source and the receiver.

Figure 2:
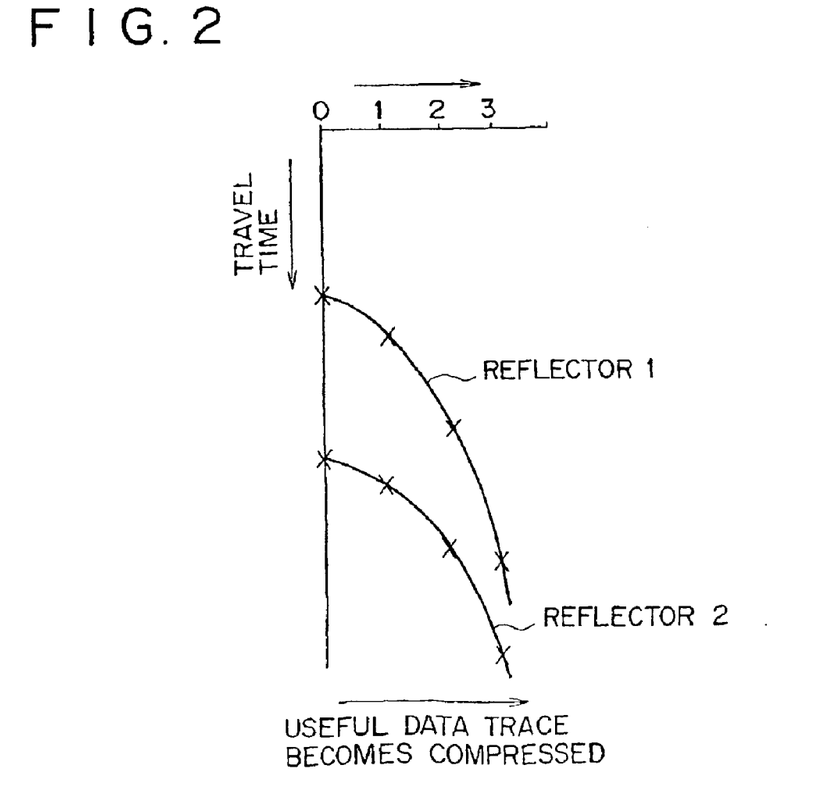
FIG. 2 shows the relationship between the round trip travel time of seismic energy and offset for the arrangement of FIG. 1.

FIG. 2 schematically illustrates the effect of offset on the travel time for seismic energy from a source to the associated receiver for the survey arrangement shown in FIG. 1, for reflections beneath the common mid point 7. The points labelled 1, 2 and 3 on the x-axis (offset) of FIG. 2 refer to, respectively, the travel time between the first source and the first receiver, between the second source and the second receiver, and between the third source and the third receiver shown in FIG. 1. It will be seen that the travel time of seismic energy associated with a particular reflection increases as the offset increases. In order to compare traces from source-receiver pairs having different offsets it is necessary to correct the traces for the effect of offset, and this is generally done be correcting traces to zero offset. This correction process is known as the normal moveout correction.

The normal moveout correction requires the velocity of propagation of seismic energy within the earth to be known or to be estimated. In reality the earth's strata beneath the receiver and source array are not isotropic, and the velocity of sound within the earth tends to increase with depth since the earth becomes more compact. Furthermore, the earth's structure may well contain a plurality of layers each having different propagation velocities for seismic energy. However, in an effective velocity model these variations in the propagation velocity of seismic energy are replaced by an effective velocity of propagation of seismic energy.

One effective velocity model assumes that the medium through which the seismic energy travels is isotropic and that the velocity of seismic energy propagating within the medium is constant. This is known as the "hyperbolic assumption". In the hyperbolic assumption, the round trip travel time for seismic energy as a function of offset for each of the reflectors defines an hyperbola. In this simplified situation the relationship between offset and the travel time for seismic energy reflected by a particular reflector is given by:

$$t^2(\text{offset}) = \frac{(\text{offset})^2}{(\text{velocity})^2} + t^2(\text{zero offset}) \qquad (1)$$

In equation (1), t is the round trip travel time, offset is the horizontal distance between the source and the receiver, and velocity is the speed of propagation of the seismic signals within the earth, which is assumed to be constant.

During processing of the seismic data obtained in a typical seismic survey, the traces are initially sorted so that traces having the same common mid point are grouped together. This enables the geology beneath the line of sources and receivers to be probed at a number of positions A velocity analysis is then performed for each common mid point, and for each reflector 9, 10. This is achieved by specifying a range of hyperbolae, as defined in equation (1), related to a range of effective velocities and computing the mean reflection amplitude along all specified hyperbolae in that range. The seismic traces for a plurality of different offsets are then converted, in accordance with the hyperbolae, to equivalent traces having zero offset. The traces are then summed. The mean amplitudes at zero offset are then examined to determine which effective velocity gives the best result.

As noted above, the travel time of seismic energy associated with a particular reflection event (that is, associated with reflection by a particular reflector) increases as the offset increases. If the step of correcting the raw seismic data to zero offset is carried out correctly, then a particular reflection event should occur at the same time in every corrected trace.

Once an appropriate effective velocity has been selected, all the seismic data relating to the common mid point for which the effective velocity has been selected are then corrected for offset using equation (1) and are then summed (or "stacked") so as to provide a stacked trace for that particular common mid point. The stacked trace has an improved signal to noise ratio compared to the individual traces recorded at the receivers.

The arrangement of seismic sources and receivers shown in FIG. 1 is known as a surface seismic survey, since the sources and receivers are all located on the earth's surface. In an alternative survey geometry, known as vertical seismic profiling (VSP) surveying, the receiver or receivers are not disposed on the earth's surface but are disposed at different depths within the earth, for example within a bore-hole. Three-component geophones are generally used as the seismic receivers in VSP seismic surveying. The seismic source or sources are disposed on the earth's surface.

Figure 3:
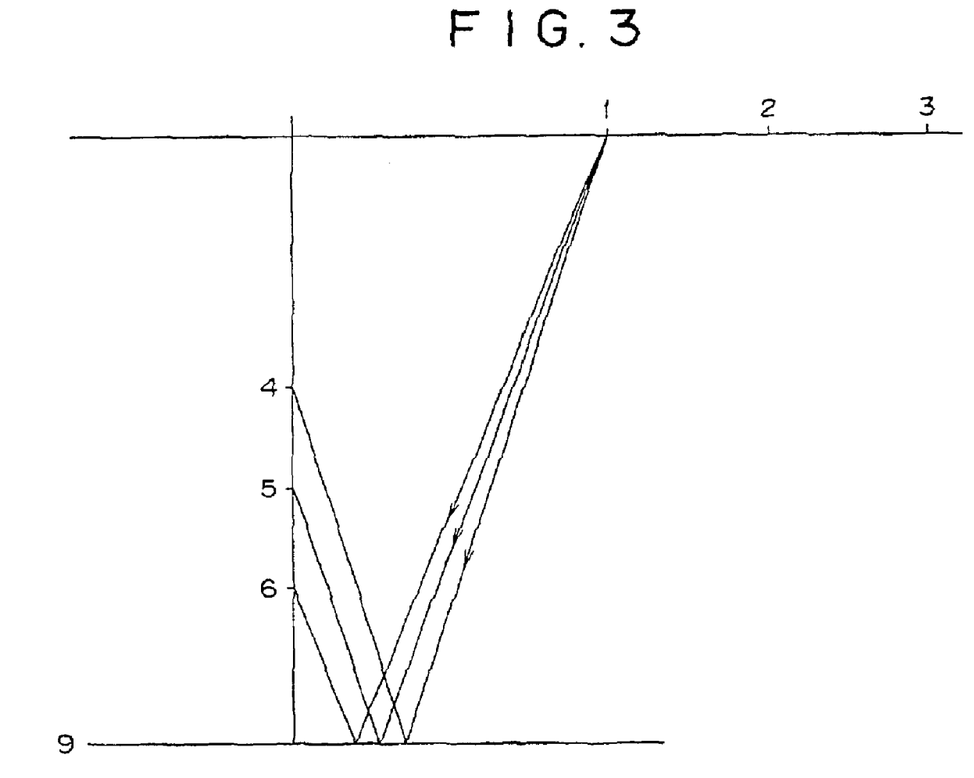
FIG. 3 is a schematic view illustrating a vertical seismic profile method of seismic data acquisition.

VSP surveying has two principal categories. In zero-offset VSP surveying, a seismic source is located vertically above the receiver(s); for example the receiver or receivers are disposed within a bore-hole, and the source is located at the top of the well. In offset VSP surveying the source is located at a horizontal distance from the point at which the vertical line on which the receiver is placed intersects the surface of the earth. FIG. 3 shows one example of an offset VSP surveying arrangement. The seismic sources 1, 2, 3 in FIG. 3 have different offsets (that is, different horizontal distances from the vertical line on which the receivers are located), so that FIG. 3 provides a multi-offset VSP surveying arrangement. These are generally known as "walkaways".

One application of VSP seismic surveying is in "look-ahead" surveying. This form of seismic surveying is used during the drilling of a bore-hole. Seismic receivers in the bore-hole are used to gather information about the geological structure beneath the drill bit. Decisions concerning the drilling operation, for example determining the safe distance to drill before setting the next string of casing, are made on the basis of information gathered about the underlying geological structure.

In look-ahead surveying, zero-offset VSP surveying is used for predicting the pore pressure beneath the drilling bit. Offset VSP surveying is used to obtain information on the geological structure below the drill head, to enable the direction of the well to be steered. Where seismic data acquired using an offset VSP surveying geometry is being used to provide information to direct the drilling of a well-bore, it is desirable that the data is processed as quickly as possible to avoid delays in the drilling process.

SUMMARY OF THE INVENTION

The present invention provides a method of processing offset vertical seismic profile (VSP) seismic data, comprising the step of correcting for the offset between the seismic source and the receiver using a non-hyperbolic effective velocity model. This simplifies the processing of the data. Since the effective velocity model is non-hyperbolic it includes effects due to the earth's layer structure and to the earth's anisotropy.

In a preferred embodiment, the step of correcting for offset comprises correcting data obtained using a source-receiver pair having non-zero offset to zero offset using the following relationship between offset and the travel time of seismic energy:

$$t^2(x, z) = az^2 + bx^2 + \frac{cx^4}{x^2 + z^2}$$

where t is the travel time of seismic energy from the source to the receiver, x is the offset between the source and the receiver, and z is the depth of the receiver.

In a preferred embodiment the step of correcting for offset further comprises transforming the path of seismic energy reflected by a reflector located at a depth $Z_{reflector}$ greater than the depth of the receiver into a direct path to a receiver at an effective depth $z_{eff}$, where $Z_{eff}=Z_{receiver}+2(Z_{reflector}-Z_{receiver})$.

A reflection path in offset VSP seismic surveying is asymmetric, since the source and receiver are at different vertical distances from the reflector. In this embodiment a reflection path in offset VSP surveying is "folded" about the depth of the receiver and so is transformed into a path that is equivalent to one half of a typical symmetric path in surface seismic surveying.

A preferred embodiment of the invention comprises: determining the travel time of a direct pulse of seismic energy for a plurality of offsets; and determining the properties of propagation of seismic energy at depths less than the depth of the receiver from travel times of the direct pulse. A direct pulse of seismic energy travels from the seismic source to the receiver without reflection, and the path of the direct pulse will never be deeper than the depth of the receiver. The travel time of the direct pulse is thus determined solely by the geological structure at depths smaller than the depth of the receiver (generally known as the "overburden"). In this embodiment of the invention the overburden is modelled as a single layer, and the seismic properties, such as the velocity of propagation of seismic energy, of the overburden layer are calculated from travel times of direct pulses of seismic energy.

Any suitable model can be used to calculate the seismic properties of the overburden layer from travel times of the direct pulses of seismic energy. For example, it may be assumed that that the velocity of propagation of seismic energy at a depth less than the depth of the receiver is independent of depth. In one embodiment of the invention it is assumed that that the velocity of propagation of seismic energy at a depth less than the depth of the receiver increases linearly with depth from the earth's surface to the receiver.

Once the seismic properties of the overburden have been estimated from travel times of direct pulses of seismic energy, a model for the propagation of seismic energy at depths greater than the receiver depth is set up. This can be done by modelling the geological structure at depths greater than the depth of the receiver as a series of layer having different seismic properties. Alternatively the geological structure below the receiver can be modelled as a single layer. In one embodiment of the invention the properties of propagation of seismic energy at depths greater than the depth of the receiver are assumed to be the properties of propagation of seismic energy determined from travel times of the direct pulses of seismic energy.

In a further embodiment of the invention, the properties of propagation of seismic energy at depths greater than the depth of the receiver are determined for a mode-conversion reflection. Seismic energy may undergo mode conversion upon reflection so, for example, a down-going P-wave may be reflected to produce an up-going S-wave. This embodiment of the invention allows accurate analysis of seismic data in which such a mode conversion has occurred.

In a preferred embodiment, the method further comprises the step of computing, the geometric spreading using the effective velocity model.

Other preferred features of the invention are set out in the dependent claims.

The present invention thus provides a method of processing VSP seismic data, in particular long-offset VSP seismic data, using an effective velocity model to determine zero offset travel times. The method of the invention reliably corrects for offset for offsets equal to, and in many cases significantly greater than, the depth of the receiver. The use of an effective velocity model is made possible by "folding" the model about the depth of the reflector to convert an asymmetric VSP reflection path into a symmetric path.

The accuracy of an effective velocity model in processing long-offset seismic data acquired in a multi-offset VSP geometry is significantly improved by modelling the overburden as a single layer, and using the arrival times of the direct pulse for different offsets to determine the seismic properties of the overburden.

The present invention allows mode-converted reflections, in which a down-going P-wave is converted into an up-going S-wave, to be handled using the same model as for P-waves. This is done by treating the P-waves as slow S-waves, preferably as slow S-waves with high elliptical anisotropy.

Furthermore, the present invention enables elastic anisotropic synthetic VSP waveforms that include geometric spreading to be computed using the effective velocity model.

The present invention has a large number of applications. For example, one application of the invention is to the anisotropic velocity analysis of VSP seismic data. The present invention allows interactive anisotropic velocity analysis to be performed on VSP seismic data, in much the same way as is currently possible for surface seismic data. This can also be done for mode-conversion reflections. An overburden calibration may or may not be applied.

Another application of the method of the present invention is in automatic velocity-depth velocity inversion, with an overburden calibration. Mode converted reflections are also handled.

Another application of the method of the invention is in fast, automated walkaway migration using a one-dimensional effective velocity model.

Another application of the method of the present invention is in elastic waveform inversion of walkaway VSP seismic data. This is done by using the effective velocity model, making an overburden calibration, and computing elastic anisotropic synthetic VSP waveforms that include geometric spreading.

Preferred embodiments of the present invention will now be described by way of illustrative example with reference to the accompanying figures in which.

BRIEF DESCRIPTION OF THE DRAWINGS

DETAILED DESCRIPTION OF PREFERRED EMBODIMENTS

As described in the introduction of this application, the processing of surface seismic data is often carried out using an effective velocity model, otherwise known as an "effective model". In an effective velocity model, or effective model, an effective velocity is derived from the seismic data, for example by fitting a curve having the form of equation (1) to seismic data, and this effective velocity is used in subsequent processing. In the present invention, an effective anisotropic model is applied to the processing of VSP seismic data.

In principle, it would be possible to apply equation (1) above to the processing of VSP seismic data. However, as discussed above, equation (1) is based on the assumption that the earth is isotropic so that the velocity of seismic energy within the earth is constant, and this assumption is usually incorrect. According to the invention, therefore, a non-hyperbolic effective velocity model that can take account of the earth's anisotropy is used. In a preferred embodiment the relationship between the round-trip travel time t and the offset x is modelled by the equation:

$$t^2(x, z) = az^2 + bx^2 + \frac{cx^4}{x^2 + z^2} \qquad (2)$$

In equation (2) x is the offset between the source and the receiver, and z is the depth of the receiver. The coefficients a, b and c are generally taken to be constant.

The relationship between offset and travel time given in equation (2) is known as the effective VTI (vertical transverse isotropic) model. Compared with equation (1), there is an extra term in the relation between offset and round-trip travel time, and this additional term makes the model effectively anisotropic. In equation (2), the first term on the right hand side of the equation is the square of the round-trip travel time at zero offset, the second term on the right hand side represents the hyperbolic moveout, while the third term is a non-hyperbolic term related to "anellipticity". The third term takes account of effects due to the earth being composed of layers, and of effects due to the intrinsic anisotropy of the earth. The addition of the third term to the right hand side of the equation makes this model more generally applicable than the hyperbolic model of equation (1).

Figure 4:
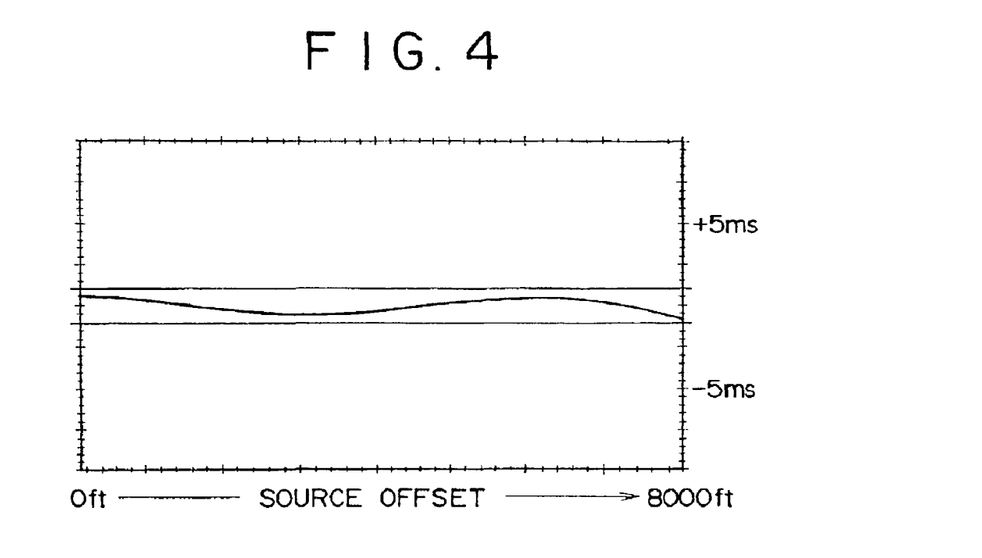
FIG. 4 shows the synthetic travel time residuals obtained with a method of processing seismic data according to the present invention.

FIG. 4 shows the results of fitting equation (2) to synthetic direct travel times computed for P-waves in a layered vertical transverse isotropic (VTI) model. The synthetic times were computed in a 116 layer VTI model, with the receiver at a depth of 5,000 feet. The travel times using equation (2) were calculated by determining the coefficients a, b and c using a least-squares fit, and using the determined values of the coefficients a, b and c to compute the travel time using equation (2). It will be seen that the difference between the travel time computed using equation (2) and the exact synthetic travel times computed using the 116 layer VTI model vary by less than 1 ms for offsets in the range 0–8,000 feet—that is, for offsets far exceeding the receiver depth of 5,000 feet. This shows that equation (2) can be used to represent the relationship between offset and travel time to a very good approximation. Equation (2) breaks down only at offsets that are extremely long compared to the depth of the receiver, or in cases where the earth has extremely large velocity contrasts.

The three coefficients of equation (2) are related to the intrinsic anisotropy parameters $\epsilon$ and $\delta$ described by Thomsen in "Geophysics" Vol 51 pp 1954–1966 (1986). If the "over burden"—that is, the geological structure above the depth of the receiver is homogenous, the relationship between the parameters of equation (2) and the parameters $\epsilon$ and $\delta$ proposed by Thomsen are as follows:

$$V_v^2 = 1/a \qquad V_{nmo}^2 = 1/b \qquad V_h^2 = 1/(b+c) \qquad (3)$$
$$V_{nmo}^2 = V_v^2(1+2\delta) \qquad V_h^2 = V_v^2(1+2\varepsilon),$$

$V_v$ and $V_h$ are the velocity of seismic energy in the vertical and horizontal directions respectively.

It is possible to adjust the coefficients a, b and c by fitting calculated travel times to observed travel times, in order to reproduce the measured relationship between travel time and offset. However, where a direct travel time measurement is not available (a "direct travel time" is the travel time of seismic energy that travels from the source to the receiver without undergoing reflection, such as the path 11 in FIG. 5) but individual interval velocities are available, it is useful to be able to determine the effective VTI coefficients a, b, c from the parameters for individual layers of the earth (in reality the earth consists of layers of different geological composition, and different layers will have different values for the coefficients a, b and c).

First, the coefficients for the $i^{th}$ layer, $a_i$, $b_i$ and $c_i$, are determined from the velocity and anisotropy parameters for the $i^{th}$ layer as follows:

$$a_i=(1/v_i)^2, \; b_i=a_i/(1+2\delta_i), \; c_i=a_i/(1+2\epsilon_i)-b_i. \qquad (4)$$

In equations (4) $a_i$ is the value of the coefficient a for the $i^{th}$ layer, and so on. Next, the effective model coefficients $a_k$, $b_k$ and $c_k$ for k layers are given by:

$$a_k = (t_k/z_k)^2, \qquad b_k = t_k \bigg/ \sum_i^k \frac{t_i}{b_i}, \qquad (5)$$

$$c_k = \left[1 - \frac{\sum_i^k \frac{t_i}{b_i^2}\left(1 - \frac{4a_ic_i}{b_i^2}\right)}{t_k}\right]\frac{b_k^2}{4a_k^2}, \qquad \text{with}$$

$$t_k = \sum_i^k z_i/v_i \quad \text{and} \quad z_k = \sum_i^k z_i. \qquad (6)$$

where $v_i$ is the vertical velocity of seismic energy in the $i^{th}$ layer.

One problem that has to be overcome in order to use an effective velocity model in a VSP or walkaway application is that equations (1) and (2) were derived for the processing of surface seismic data, in which the paths of seismic data are symmetric about the common mid point as shown in FIG. 1. In contrast, in VSP surveying the paths of seismic energy are generally not symmetric, as shown in FIG. 3. Only paths in which seismic energy travels direct from a source to a receiver without undergoing a reflection, such as the path 11 shown in FIG. 5, can be considered to be symmetric. In order to apply equation (1) or (2) to VSP data obtained for a path that involves a reflection, it is necessary to make the geometry of the VSP reflection paths symmetric. This is done by folding the model below the receiver about the depth of the reflector, as shown in FIG. 5.

Figure 5:
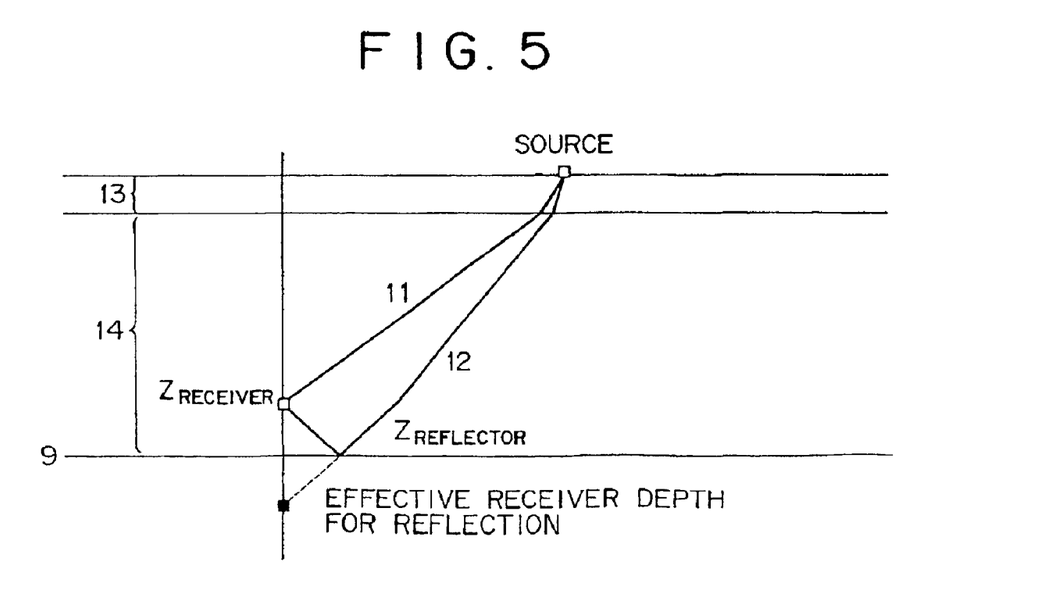
FIG. 5 is a schematic illustration of the procedure used to transform an offset VSP reflection ray path into a direct ray path.

FIG. 5 schematically shows two ray paths for seismic energy in an offset VSP survey. One path 11 is a path of seismic energy that travels from the source to the receiver without undergoing reflection (although refraction occurs at the boundary between layers 13 and 14 of the earth). The path 11 is known as the "direct path", and seismic energy that travels along the direct path produces a pulse known as the "direct pulse" or "direct arrival" in the seismic data. Ray 12 shows a path from the source to the receiver that involves reflection by a reflector 9 located at a greater depth than the depth of the receiver.

In order to convert an asymmetric path such as path 12 to a symmetric path, the model below the receiver is folded at the reflector depth, thereby putting the effective depth of the receiver at:

$$Z_{eff}=Z_{receiver}+2(Z_{reflector}-Z_{receiver}). \qquad (7)$$

The path obtained by folding the model below the reflector corresponds to a direct VSP path, or to one half of a path of seismic energy in a surface seismic survey. With this modification, therefore, an effective VTI model can be used to represent offset VSP reflection times in a one-dimensional VTI model.

Figure 6:
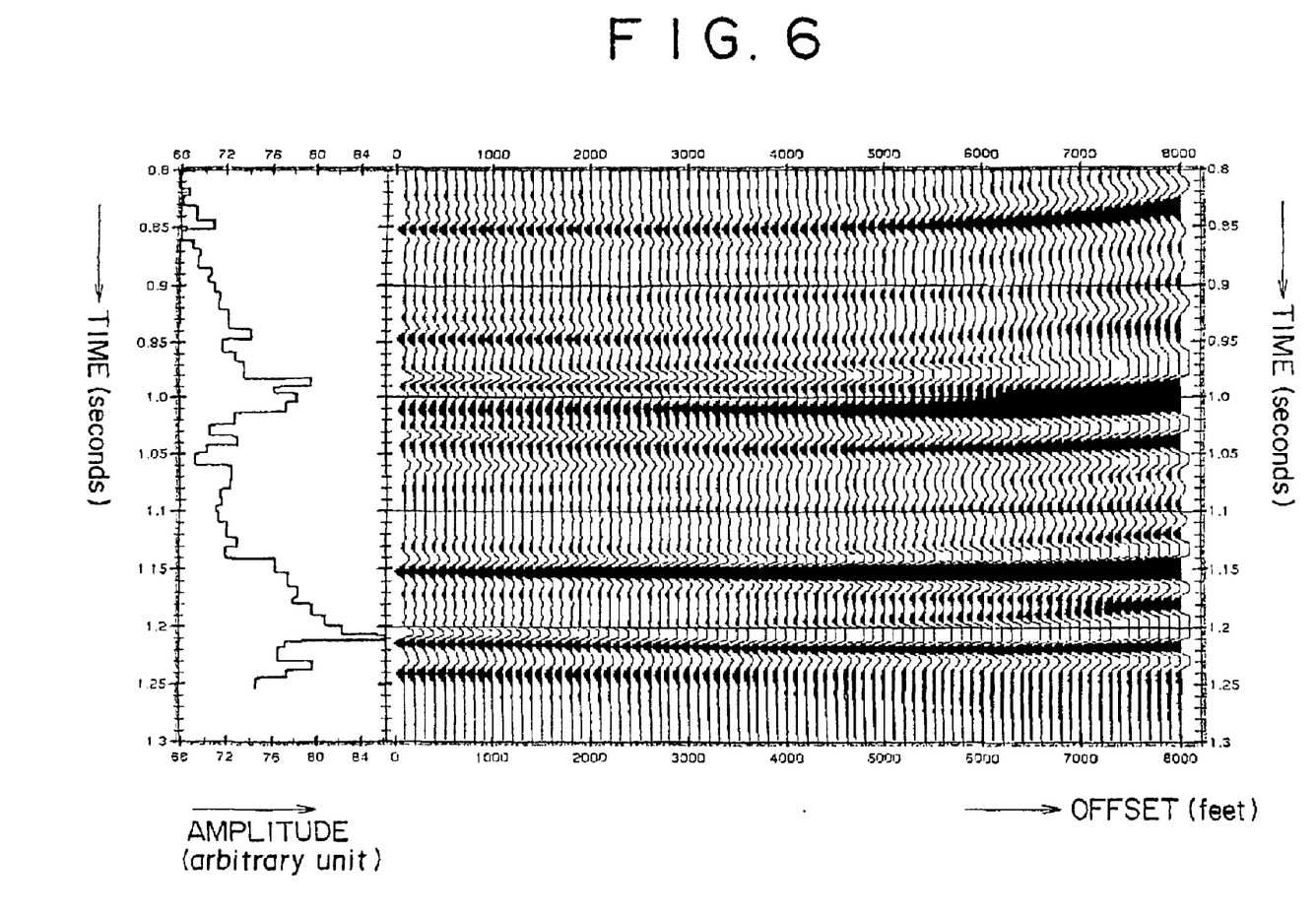
FIG. 6 shows results of performing the moveout correction using the method of the present invention.

FIG. 6 shows results of using an effective velocity model to correct traces to zero offset travel time. The seismic data are synthetic walkaway P-p reflection data simulated using a receiver at a depth of 5,000 feet and an isotropic 116 layer model for the earth.

The left hand part of FIG. 6 shows a simulated trace received by the receiver from a source placed vertically above the receiver. In the simulation, the offset was increased from 0 to 8,000 feet, in intervals of 100 feet.

The simulated seismic data were then corrected for moveout using the true 1-D layered model and equations (4), (5), (6) and (2). The results of this correction are shown in the right hand side of FIG. 6.

If the correction for moveout had been carried out accurately, a feature should appear at the same time in each corrected seismic trace, regardless of the offset. Examination of FIG. 6 shows that this is the case for offsets of up to around the receiver depth (5,000 feet). For offsets greater than the receiver depth, however, the travel time of features in the seismic traces begins to vary with offset.

The results of FIG. 6 shows that the effective velocity model begins to break down at offsets greater than the depth of the receiver. This problem must be overcome in order to allow an effective velocity model to be used in the analysis of long-offset VSP data.

This problem can be overcome by assuming that the earth above the receiver consists of a single layer. Effective velocity model coefficients can be determined for this single layer extending down to the depth of the receiver by fitting equation (2) to the direct travel time for P-waves—that is, for the path 11 in FIG. 5. This provides an accurate representation of the moveout for a reflection at the depth of the receiver. Once this has been done, model layer parameters are used for the reflections at depths greater than the receiver depth The model layer parameters can be assumed known, for example from previous surveys, or they can be determined by trial and error, for example by inversion of the seismic data or by interactive velocity analysis.

Figure 7:
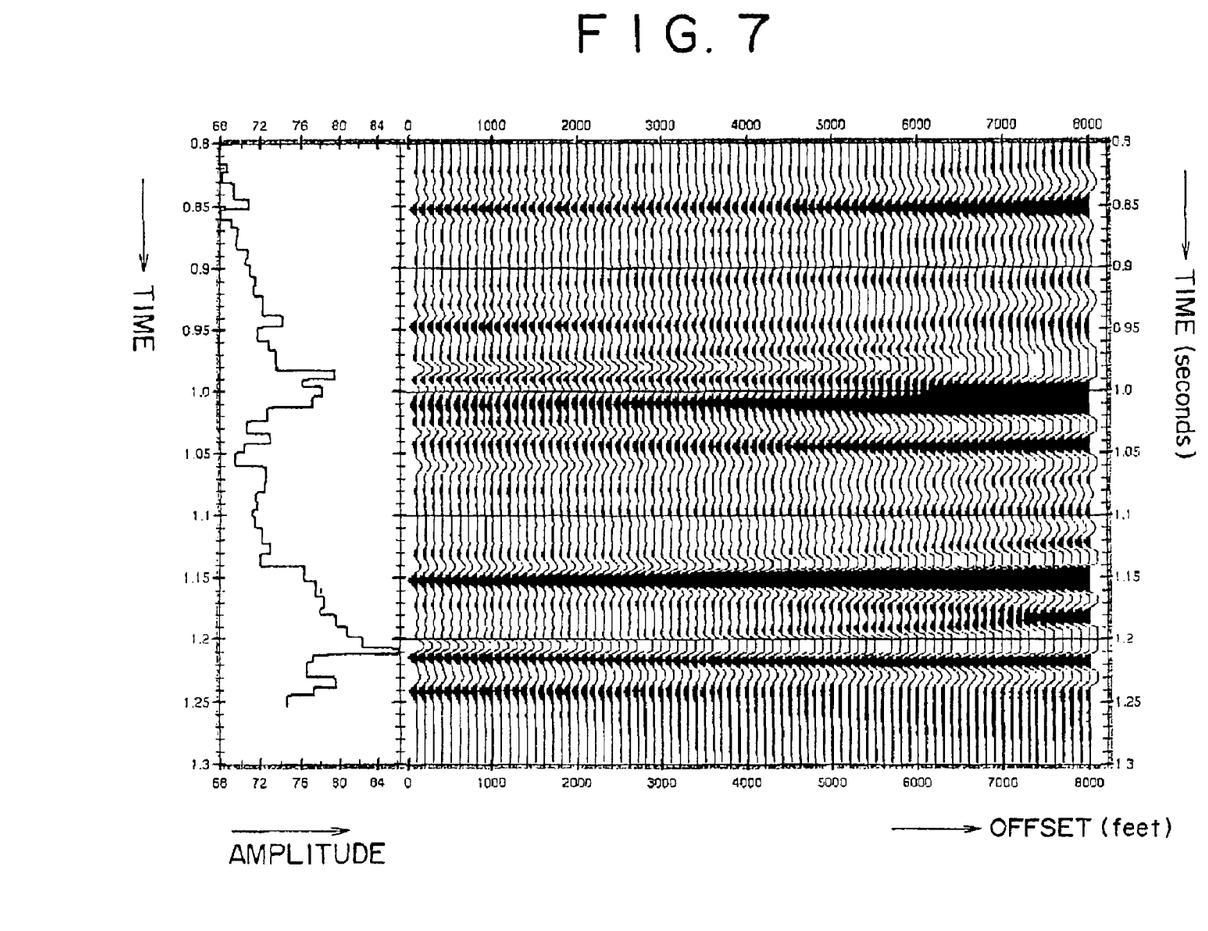
FIG. 7 shows the results of performing the moveout correction using a further embodiment of the present invention.

FIG. 7 shows the results of applying this modified processing method to the same simulated data used in FIG. 6. It will be seen that the correction for offset is now accurate out to the maximum offset used in this simulation (8,000 feet).

The results of FIGS. 6 and 7 relate to simulated seismic data that were generated assuming that the earth is isotropic. The present invention is not, however, limited to the isotropic assumption.

Figure 8:
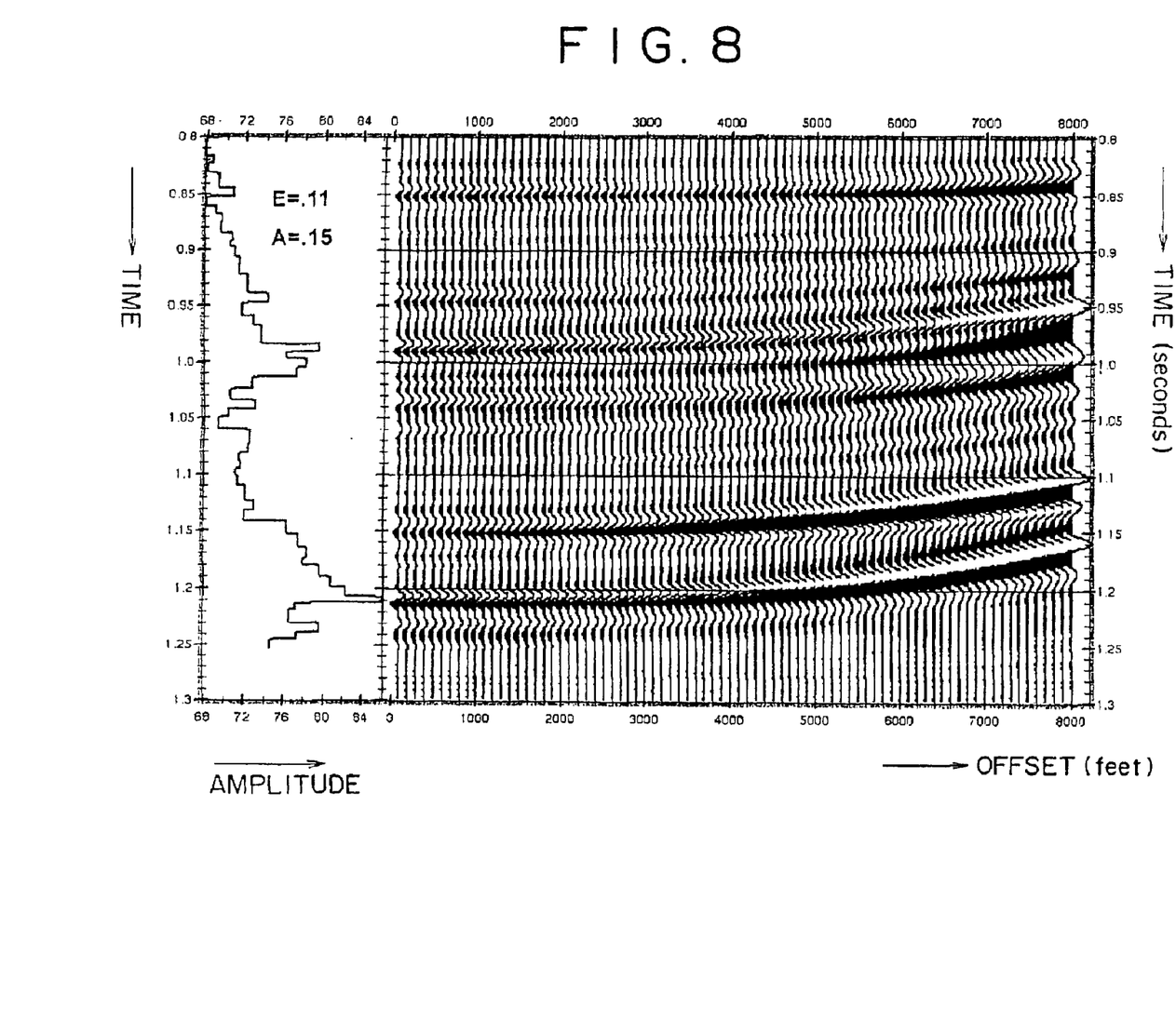
FIG. 8 shows the results of performing the moveout correction for anisotropic reflection paths.

FIG. 8 shows the effect of applying one embodiment of the present invention to simulated seismic data that was simulated using an anisotropic model of the earth.

The correction for offset in FIG. 8 was carried out in the same way as FIG. 7—that is, effective model coefficients were determined using equation (2) for a single layer down to the receiver depth from the arrival time of the direct pulse, and true model layer parameters were used for reflections below the receiver. In FIG. 8, the parameters for the layers below the receiver were determined using the isotropic assumption and, in consequence, the correction for offset has not been performed accurately. It will be seen that an event occurs progressively earlier in the corrected seismic traces as the offset increases.

The parameters E and A shown in FIG. 8 are Schoenberg's parameters, and refer to the maximum anisotropy in the model used to simulate the seismic data. These parameters are approximately equivalent to $\epsilon$ and $\delta$-$\epsilon$ of equation (3).

Figure 9:
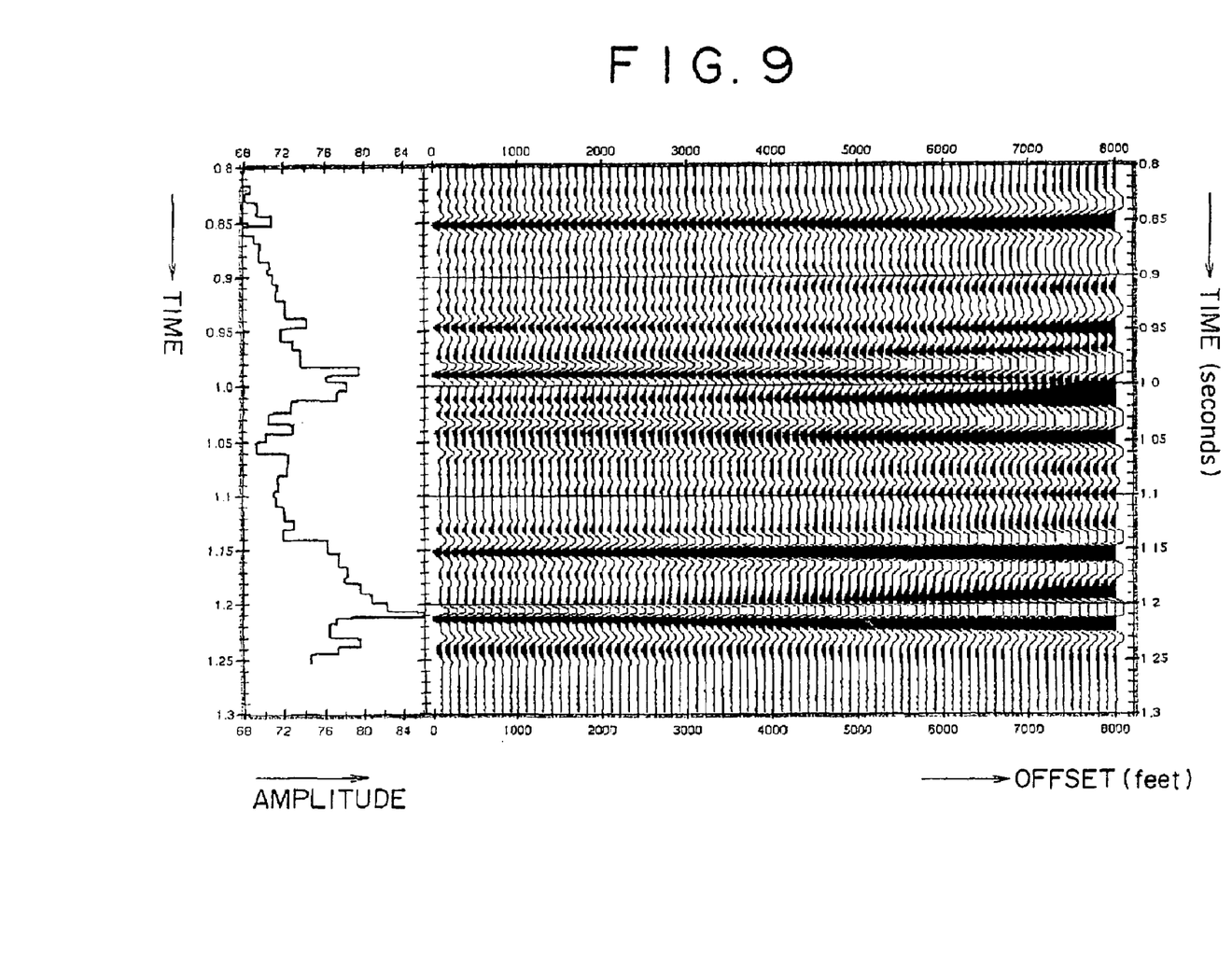
FIG. 9 corresponds to FIG. 8, but is for a method of the present invention.

FIG. 9 shows the results of correcting the same simulated anisotropic seismic data as in FIG. 8 using a further embodiment of the invention. In this embodiment the overburden is again treated as a single layer, and the parameters of this overburden layer are determined from the arrival times of the direct pulse for different offsets. In contrast to FIG. 8, the true VTI model is used for reflections below the receiver. It will be seen that the reflection events in the seismic traces are accurately flattened—a particular seismic event occurs at a substantially constant time throughout the corrected seismic traces, to the maximum offset used in the simulation (8,000 feet).

The above examples relate only to P-waves. However, the present invention can also be applied to shear waves. Converted reflections in which, for example, a down-going P-wave is converted on reflection to an up-going S-wave, are of particular interest and have been studied extensively for surface seismic geometries.

The equations governing the use of an effective velocity model for a mode-converted reflection are considerably more complicated than for the case of a reflection for which there is no change in mode.

For the walkaway case, where overburden calibration can be carried out, it has been found that a good approximation is to treat a shear wave as a slow P-wave, but having modified anisotropy parameters.

The relationship between the vertical, horizontal and move out velocities for a Sv wave are given by Thomsen, above, as:

$$V_{nmo}^2 = V_v^2(1 + 2\delta) \quad V_h^2 = V_v^2 \quad \text{with} \quad \sigma = (\varepsilon - \delta)\frac{v_p^2}{v_s^2}. \tag{8}$$

By comparing equation (8) with equation (3), it can be seen that $\sigma$ a for an Sv wave plays the role of $\delta$ for a P wave, and that $\epsilon$ has no role in a Sv wave. This would indicate that a Sv wave could be treated in the same way as a P-wave, with the following substitutions:

$$V_{pi}=V_{si} \quad \delta_i=\sigma_i \quad \epsilon_i=0. \tag{9}$$

However, simulations carried out using this simple approach were unsatisfactory, and indicated that higher velocities were needed at large offsets. The choice of $V_{horizontal}$ was clearly wrong, and it is also clear that $\epsilon_i \neq 0$. It has been found that setting $\epsilon_i=\sigma_i$ produces surprisingly good results. An explanation for this is that the velocity of a Sv wave as a function of an angle is approximately an ellipse out to about 35°, but setting $\epsilon=\delta=\sigma$ is the criterion for elliptical (P) anisotropy. The angle of propagation for the shear leg of a converted reflection rarely exceeds 30°, so the elliptical approximation would be expected to work well, and indeed does work well.

A consequence of this new method of approaching the propagation of shear waves is that, with a simple substitution, the same equations used for P-waves can also be used for mixed mode reflections. For a mode conversion reflection in which a downgoing P-wave is converted to an upgoing S-wave, the upwards leg is much shorter than the downgoing leg and this, with the method of calibrating the properties of the overburden using travel times of the direct pulses, allow mode converted reflections to be handled with sufficient accuracy for practical applications.

Figure 10:
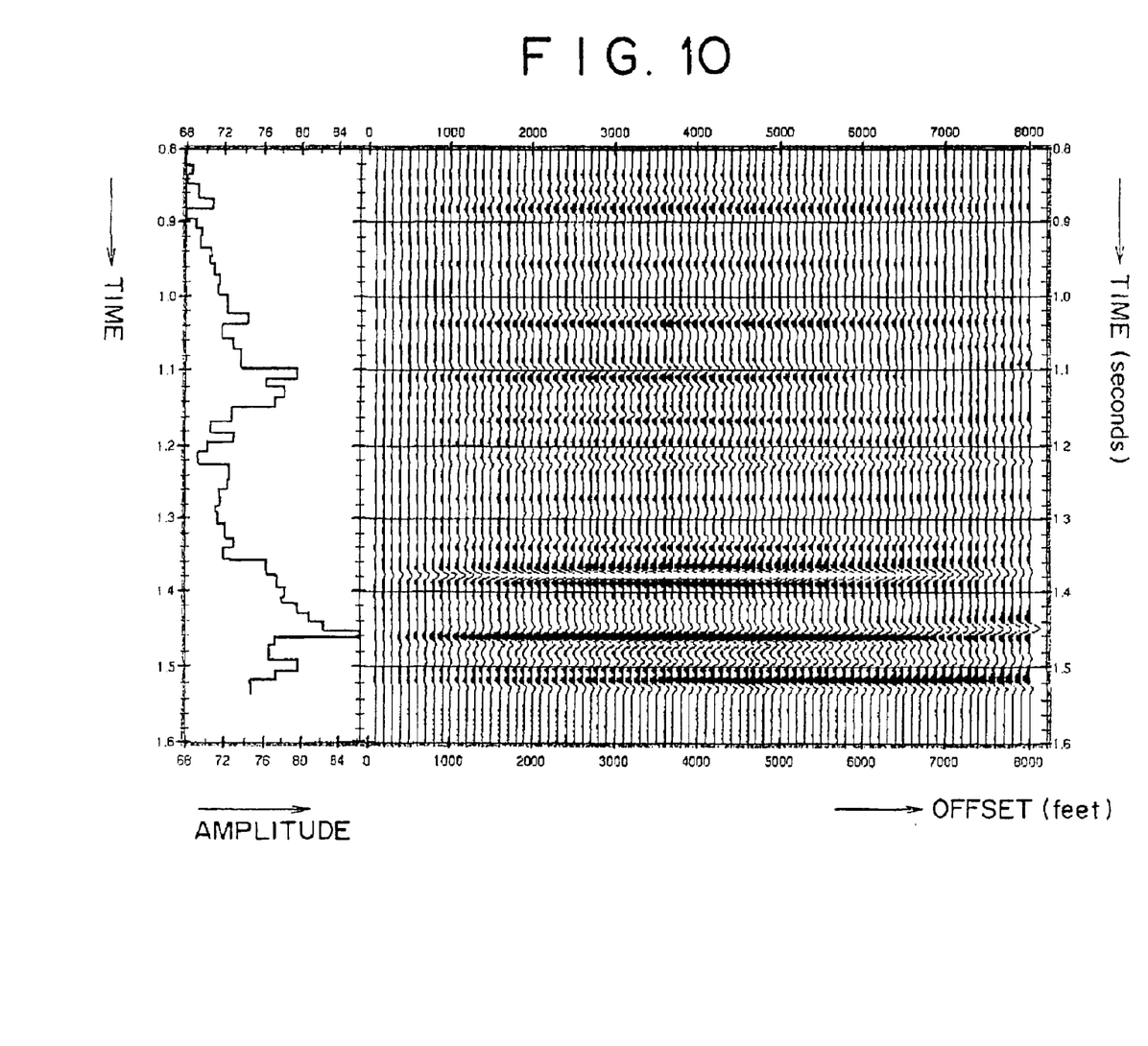
FIG. 10 show results of correcting for offset according to a further embodiment of the present invention.

FIG. 10 shows the results of applying the present invention to a mixed-mode P-S reflection. As with FIGS. 6–9, the method of the invention is applied to synthetic seismic data that was simulated for a 116 model layer of the earth. FIG. 10 shows the results of this embodiment of the invention applied to synthetic seismic data the simulation of which includes mode conversion from P-waves to S-waves on reflection. The simulated data was corrected for offset using the non-hyperbolic model of equations (2) and (4)–(6), together with equation (9) but modified to have $\epsilon_i=\sigma_i$.

The correction for offset in FIG. 10 was carried out without using the step of calibrating the properties of the overburden through the fitting of the arrival times of the direct pulses. It was, however, found that results of performing the moveout correction including the overburden calibration were virtually identical to those shown in FIG. 10.

In the embodiments described above the step of calibrating the properties of the overburden by fitting equation (2) to travel times of direct pulses has been carried out on the assumption that the coefficients a, b and c are all constants.

It is possible to compute geometrical spreading from the effective model, and this is useful since it allows for model-based amplitude correction. Geometric spreading G in a layered earth is given by B. Ursin in "Geophysics" Vol 55, p492–496 (1991) as:

$$G^2 = \frac{1}{v_s^2}\left|\cos i_s \cos i_r \frac{dX}{dp}\frac{X}{p}\right|. \tag{10}$$

In equation (10) X is offset, p is the ray parameter or horizontal slowness, $v_s$ is the velocity of seismic energy at the source and $i_s$ and $i_r$ are the ray angle at the source (s) and receiver (r) respectively. Given the velocity at the receiver, $v_r$ (which can be determined in the case of P waves from direct arrival times and polarization angles if needed), then all terms in equation (10) can be determined from equation (2) as follows.

$$p = \frac{dt}{dx}, \quad \frac{dX}{dp} = \left[\frac{d^2t}{dx^2}\right]^{-1}, \tag{11}$$

$$\cos i_s = (1 - p^2 v_s^2)^{1/2}, \quad \cos i_r = (1 - p^2 v_r^2)^{1/2}.$$

Geometrical spreading can therefore be computed given the $1^{st}$ and $2^{nd}$ derivatives of equation (2) with respect to offset. For reflection coefficients, if the layer properties across the interface are known, only the horizontal slowness, p, is needed. Geometrical spreading and reflection coefficients allow the effective model to be used to compute anisotropic synthetic seismograms, which are needed for waveform inversion schemes.

The effective VTI model should make 1D imaging virtually interactive for 2D walkaway migration, and for 3D walkaways, 1D migration should take minutes rather than hours. Since many final models are still only 1D the TAT (turn around time) of the final product would be dramatically reduced. For situations where the model needs to have 2D or 3D velocity variation, effective model 1D migration could be used to give a quick preliminary result. In effective model migration two effective models are required, one from source to image point and another from image point to receiver.

It should be noted that the present invention does not require a layered model. In principle, once the parameters of the overburden have been determined by fitting the arrival times of the direct pulses, the moveout can be carried out by assuming a single, isotropic velocity for the earth below the receiver and determining this velocity by fitting to the data. Alternatively, once the parameters of the overburden have been determined by fitting the arrival times of the direct pulses, the moveout can be carried out by using a compaction trend velocity field for depths below the receiver, to take account of the tendency for the velocity of sound to increase with depth as a result of the increasing pressure.

In the embodiments described above the parameters of the overburden layer have been assumed to be uniform and isotropic. This assumption will not be correct, and the properties of the overburden will be anisotropic to some extent. This intrinsic anisotropy can be approximately determined for the overburden by, for example. assuming that the velocity of seismic energy has a linear gradient from the earth's surface to the receiver, as suggested by T.Alkhalifah in "Geophysics", Vol 62, p1839–1854 (1997). The average intrinsic anisotropy parameters determined for the overburden in this way could then be attributed to layers below the receiver. The results of this method should be sufficiently accurate for time migration and could be determined automatically from the seismic data, for example at the well site.

One reason for wanting to determine seismic velocities from walkaway reflection moveout is that the low frequency trend in velocities resides in the moveout, not in the amplitudes. Low frequency trend estimation is the major shortcoming of current look-ahead VSP inversion techniques, and walkaway moveout inversion will supply the missing low frequency information for look-ahead VSP inversion.

As noted above, one of the important uses of VSP inversions is to predict the onset of overpressure in look-ahead surveying. The velocity of shear-waves is more sensitive to overpressure than is the velocity of P-waves, and it therefore desirable to be able to process shear-wave data. The method of processing converted reflection data described above makes it possible to determine both the velocity of P-waves and the velocity of shear waves below the receiver, and this should improve the ability to predict the onset of overpressure.

Finally, the ability to compute reflection amplitudes means that the effective model approach can be used in a waveform inversion, where moveout and amplitudes are matched.

The computational saving of effective VTI models over ray-tracing methods can be considerable, with the saving being approximately proportional to the number of rays traced for processing. These reductions in the amount of processing required will allow the migration step to be completed in minutes rather than hours. The speed of carrying out the normal moveout correction, the application selected to demonstrate the feasibility of the technique in this application, makes interactive normal moveout correction possible, as is done today in surface seismic velocity analysis. Walkaway moveout and waveform inversion are other applications that will benefit greatly from the speed of effective model computations.

What is claimed is:

1. A method of processing offset vertical seismic profile (VSP) seismic data, comprising the step of correcting for the offset between the seismic source and the receiver using a non-hyperbolic effective velocity model, wherein the step of correcting for offset comprises transforming the path of seismic energy reflected by a reflector located at a depth $z_{reflector}$ greater than the depth of the receiver into a direct path to a receiver at an effective depth $z_{eff}$, where $z_{eff} = z_{receiver} + 2(z_{reflector} - z_{receiver})$.

2. A method as claimed in claim 1 wherein the step of correcting for offset comprises correcting data obtained using a source-receiver pair having non-zero offset to obtain the travel time of seismic energy at zero offset using the following relationship between offset and the travel time of seismic energy:

$$t^2(x, z) = az^2 + bx^2 + \frac{cx^4}{x^2 + z^2} \tag{1}$$

where t is the travel time of seismic energy from the source to the receiver, x is the offset between the source and the receiver, and z is the depth of the receiver.

3. A method as claimed in claim 2 further comprising determining the travel time of a direct pulse of seismic energy for a plurality of offsets; and determining the properties of propagation of seismic energy at depths less than the depth of the receiver from travel times of the direct pulse.

4. A method as claimed in claim 1 further comprising determining the travel time of a direct pulse of seismic energy for a plurality of offsets; and determining the properties of propagation of seismic energy at depths less than the depth of the receiver from travel times of the direct pulse.

5. A method as claimed in claim 2 wherein the step of correcting for offset comprises the step of determining of the coefficients a, b and c in equation (1) for a layer extending from the surface of the earth to the depth of the receiver using the travel times of a direct pulse of seismic energy for a plurality of offsets.

6. A method as claimed in claim 4 wherein the properties of propagation of seismic energy at depths less than the depth of the receiver are determined from travel times of the direct pulse on the assumption that the velocity of seismic energy increases between the earth's surface and the receiver.

7. A method as claimed in 4 wherein the properties of propagation of seismic energy at depths greater than the depth of the receiver are assumed to be the properties of propagation of seismic energy determined from travel times of the direct pulses of seismic energy.

8. A method as claimed in claim 5 wherein the step of correcting for offset comprises applying equation (1), the coefficients a, b and c for depths less than the depth of the receiver ($z_{receiver}$) being determined from travel times of the direct pulse of seismic energy, and the coefficients a, b and c for depths greater than the depth of the receiver being determined for a reflection in which a down-going P-wave is converted to an up-going P-wave.

9. A method as claimed in claim 8 wherein the step of correcting for offset further comprises applying an isotropic model for depths greater than the depth of the receiver.

10. A method as claimed in claim 8 wherein the step of correcting for offset further comprises applying an anisotropic model for depths greater than the depth of the receiver.

11. A method as claimed in claim 10 wherein the step of correcting for offset further comprises applying equation (1) for depths greater than the depth of the receiver.

12. A method as claimed in claim 8 wherein the step of correcting for offset further comprises using a multi-layer model for depths greater than the depth of the receiver.

13. A method of processing offset vertical seismic profile (VSP) seismic data, comprising the step of correcting for the offset between the seismic source and the receiver using a non-hyperbolic effective velocity model, wherein the step of correcting for offset comprises transforming the path of seismic energy reflected by a reflector located at a depth $z_{reflector}$ greater than the depth of the receiver into a direct path to a receiver at an effective depth $z_{eff}$, where $z_{eff} = z_{receiver} + 2(z_{reflector} - z_{receiver})$ wherein the properties of propagation of seismic energy at depths greater than the depth of the receiver are determined on the basis that the reflection is a mode-conversion reflection.

14. A method as claimed in claim 13 wherein the step of correcting for offset further comprises correcting data obtained using a source-receiver pair having non-zero offset to obtain the travel time of seismic energy at zero offset using the following relationship between offset and the travel time of seismic energy:

$$t^2(x, z) = az^2 + bx^2 + \frac{cx^4}{x^2 + z^2} \qquad (1)$$

where t is the travel time of seismic energy from the source to the receiver, x is the offset between the source and the receiver, and x is the depth of the receiver, the coefficients a, b and c for depths less than the depth of the receiver ($z_{receiver}$) being determined from travel times of the direct pulse of seismic energy, and the coefficients a, b and c for depths greater than the depth of the receiver being determined for a reflection in which a down-going P-wave is converted to an up-going S-wave.

15. A method as claimed in claim 13 wherein the step of correcting for offset further comprises correcting data obtained using a source-receiver pair having non-zero offset to obtain the travel time of seismic energy at zero offset using the following relationship between offset and the travel time of seismic energy:

$$t^2(x, z) = az^2 + bx^2 + \frac{cx^4}{x^2 + z^2} \qquad (1)$$

where t is the travel time of seismic energy from the source to the receiver, x is the offset between the source and the receiver, and x is the depth of the receiver, the coefficients a, b and c for all depths being determined for a reflection in which a down-going P-wave is converted to an up-going S-wave.

16. A method of processing offset vertical seismic profile (VSP) seismic data, comprising:
the step of correcting for the offset between the seismic source and the receiver using a non-hyperbolic effective velocity model, wherein the step of correcting for offset comprises:
transforming the path of seismic energy reflected by a reflector located at a depth $z_{reflector}$ greater than the depth of the receiver into a direct path to a receiver at an effective depth $z_{off}$ where $z_{off} = z_{receiver} + 2(z_{reflector} - z_{receiver})$ wherein the properties of propagation of seismic energy at depths greater than the depth of the receiver are determined on the basis that the reflection is a mode-conversion reflection, and
correcting data obtained using a source-receiver pair having non-zero offset to obtain the travel time of seismic energy at zero offset using the following relationship between offset and the travel time of seismic energy:

$$t^2(x, z) = az^2 + bx^2 + \frac{cx^4}{x^2 + z^2} \qquad (1)$$

where t is the travel time of seismic energy from the source to the receiver, x is the offset between the source and the receiver, and z is the depth of the receiver, the coefficients a, b and c for an up-going S-wave being determined by modelling the S-wave as a slow P-wave.

17. A method as claimed in claim 16 wherein the coefficients a, b and c for the up-going S-wave are determined by modelling the S-wave as a slow P-wave with high elliptical anisotropy.

18. A method as claimed in claim 17 wherein the coefficients a, b and c for the up-going S-wave are determined by modelling the S-wave as a slow P-wave with $\epsilon = \sigma$, where $\epsilon$ and $\sigma$ are anisotropy parameters.

19. A method of processing offset vertical seismic profile (VSP) seismic data, comprising the step of correcting for the offset between the seismic source and the receiver using a non-hyperbolic effective velocity model, wherein the step of correcting for offset comprises transforming the path of seismic energy reflected by a reflector located at a depth $z_{reflector}$ greater than the depth of the receiver into a direct path to a receiver at an effective depth $z_{eff}$, where $z_{eff} = z_{receiver} + 2(Z_{reflector} - z_{receiver})$, and further comprising the step of computing the geometric spreading of the seismic data using the effective velocity model.

20. A method as claimed in claim 19 wherein the geometric spreading is computed using $$G^2 = \frac{1}{v_s^2} \left| \cos i_s \cos i_r \frac{dX}{dp} \frac{X}{p} \right|$$

where G is the horizontal spreading, X is the offset, p is the horizontal slowness, $v_s$ and $v_r$ are the velocity of seismic energy at the source and the receiver respectively, and $i_s$ and $i_r$ are the ray angle at the source and receiver respectively.

21. A method as claimed in claim 19 wherein the step of correcting for offset comprises correcting data obtained using a source-receiver pair having non-zero offset to obtain the travel time of seismic energy at zero offset using the following relationship between offset and the travel time of seismic energy:

$$t^2(x, z) = az^2 + bx^2 + \frac{cx^4}{x^2 + z^2} \qquad (1)$$

where t is the travel time of seismic energy from the source to the receiver, x is the offset between the source and the receiver, and z is the depth of the receiver, wherein the geometric spreading is computed using $$G^2 = \frac{1}{v_s^2} \left| \cos i_s \cos i_r \frac{dX}{dp} \frac{X}{p} \right|$$

where G is the horizontal spreading, X is the offset, p is the horizontal slowness, $v_s$ and $v_r$ are the velocity of seismic energy at the source and the receiver respectively, and $i_s$ and $i_r$ are the ray angle at the source and receiver respectively, and where p and dX/dp are calculated using $$p = \frac{dt}{dx}, \quad \text{and} \quad \frac{dX}{dp} = \left[\frac{d^2t}{dx^2}\right]^{-1}$$

22. A method as claimed in claim 1 wherein the VSP seismic data is walkaway seismic data.

* * * * *